(12) United States Patent
Speyer et al.

(10) Patent No.: US 8,925,249 B2
(45) Date of Patent: Jan. 6, 2015

(54) ACTIVE SEALING AND SECURING SYSTEMS FOR DOOR/WINDOW

(75) Inventors: William Kip Speyer, Boca Raton, FL (US); Jonathan D. Thielmann, Delray Beach, FL (US); Don S. Salerno, Hollywood, FL (US)

(73) Assignee: Tyto Life LLC, Burlingame, CA (US)

( * ) Notice: Subject to any disclaimer, the term of this patent is extended or adjusted under 35 U.S.C. 154(b) by 0 days.

(21) Appl. No.: 11/756,957

(22) Filed: Jun. 1, 2007

(65) Prior Publication Data
US 2007/0290456 A1 Dec. 20, 2007

Related U.S. Application Data

(63) Continuation-in-part of application No. 11/425,377, filed on Jun. 20, 2006, now Pat. No. 7,624,539.

(51) Int. Cl.
*E06B 7/20* (2006.01)
*F16J 15/02* (2006.01)
*E05C 19/00* (2006.01)
*E06B 7/16* (2006.01)

(52) U.S. Cl.
CPC .............. *F16J 15/028* (2013.01); *E05C 19/002* (2013.01); *E06B 7/16* (2013.01)
USPC .................. 49/309; 49/303; 49/316; 49/475.1

(58) Field of Classification Search
USPC ........ 49/400, 401, 475.1, 303, 304, 306, 309, 49/316, 504
See application file for complete search history.

(56) References Cited

U.S. PATENT DOCUMENTS

| | | | |
|---|---|---|---|
| 19,217 A | * | 1/1858 | Tinney ............................ 49/309 |
| 724,139 A | | 3/1903 | Smith |

(Continued)

OTHER PUBLICATIONS active. Dictionary.com. The American Heritage® Dictionary of the English Language, Fourth Edition. Houghton Mifflin Company, 2004. http://dictionary.reference.com/browse/active (accessed: Sep. 30, 2009.*

(Continued)

*Primary Examiner* — Katherine Mitchell
*Assistant Examiner* — Catherine A Kelly
(74) *Attorney, Agent, or Firm* — Nelson Mullins Riley & Scarborough LLP; Anthony A. Laurentano

(57) ABSTRACT

A combined sealing system for connecting a panel to a frame includes a first active sealing system and a first passive seal. The first active sealing system engages a first surface of the panel or a first surface of the frame. The first passive seal engages a second surface of the panel and a second surface of the frame. Upon the panel being in a single closed position relative to the frame, the active sealing system has a locked configuration and an unlocked configuration, and the active sealing system in the locked configuration causes the first passive seal to be further engaged.

7 Claims, 7 Drawing Sheets

(56) References Cited

U.S. PATENT DOCUMENTS

| | | | |
|---|---|---|---|
| 946,305 A | 1/1910 | Twyman | |
| 982,828 A | 1/1911 | Kelly | |
| 1,009,978 A | 11/1911 | Knappe | |
| 1,021,862 A | 4/1912 | Culver | |
| 1,170,101 A | 2/1916 | Pullets | |
| 1,178,775 A | 4/1916 | Albright | |
| 1,345,967 A | 7/1920 | Smelser | |
| 1,468,958 A * | 9/1923 | Champion | 49/304 |
| 1,489,018 A | 4/1924 | Shultz | |
| 1,675,230 A | 6/1928 | Snyder | |
| 1,715,188 A | 5/1929 | Bullock | |
| 1,797,839 A * | 3/1931 | Ramsay | 49/309 |
| 1,974,269 A | 9/1934 | Gonder | |
| 1,977,726 A | 10/1934 | Jacobson | |
| 1,995,939 A | 3/1935 | Osten | |
| 2,207,065 A | 7/1940 | McCormick | |
| 2,248,719 A | 7/1941 | Owen | |
| 2,268,114 A | 12/1941 | Foster | |
| 2,541,421 A * | 2/1951 | Hunter | 49/305 |
| 2,552,369 A | 5/1951 | Currie | |
| 2,593,093 A | 4/1952 | Bjork | |
| 2,628,678 A | 2/1953 | Webster | |
| 2,719,342 A | 10/1955 | Hunt | |
| 2,753,020 A * | 7/1956 | Ware, Jr. | 49/318 |
| 2,766,860 A * | 10/1956 | Travis | 49/318 |
| 2,805,451 A | 9/1957 | Evans | |
| 2,837,151 A | 6/1958 | Stroup | |
| 2,862,256 A | 12/1958 | Stroup | |
| 2,862,262 A | 12/1958 | Shea | |
| 2,928,144 A | 3/1960 | Persson | |
| 3,004,309 A | 10/1961 | Karodi | |
| 3,054,152 A | 9/1962 | Trammell | |
| 3,059,287 A | 10/1962 | Baruch | |
| 3,070,856 A | 1/1963 | Minick | |
| 3,077,644 A | 2/1963 | Kesling | |
| 3,098,519 A | 7/1963 | Myers | |
| 3,111,727 A | 11/1963 | Gerecke | |
| 3,126,051 A * | 3/1964 | Sussin | 160/40 |
| 3,163,891 A | 1/1965 | Seliger | |
| 3,184,806 A | 5/1965 | Bragman | |
| 3,252,255 A | 5/1966 | Marpe | |
| 3,289,377 A | 12/1966 | Hetman | |
| 3,295,257 A | 1/1967 | Douglass | |
| 3,335,524 A | 8/1967 | Carson | |
| 3,374,821 A | 3/1968 | White | |
| 3,383,801 A | 5/1968 | Dallaire | |
| 3,466,801 A | 9/1969 | Bohn | |
| 3,512,303 A * | 5/1970 | Wright | 49/309 |
| 3,590,530 A | 7/1971 | Duguay | |
| 3,590,531 A | 7/1971 | Childs | |
| 3,660,936 A | 5/1972 | Bryson | |
| 3,660,940 A | 5/1972 | Tavano | |
| 3,816,966 A * | 6/1974 | Sause, Jr. | 49/317 |
| 3,818,636 A | 6/1974 | Calais et al. | |
| 3,821,884 A | 7/1974 | Walsh | |
| 3,848,908 A | 11/1974 | Rich | |
| 3,857,199 A | 12/1974 | Frach et al. | |
| 3,910,155 A | 10/1975 | Wilson | |
| 3,959,927 A | 6/1976 | Good | |
| 4,018,022 A | 4/1977 | Fink | |
| 4,027,431 A | 6/1977 | Rackard | |
| 4,064,651 A | 12/1977 | Homs | |
| 4,128,967 A | 12/1978 | Kirsch | |
| 4,170,846 A * | 10/1979 | Dumenil et al. | 49/303 |
| 4,307,542 A | 12/1981 | Lense | |
| 4,317,312 A | 3/1982 | Heideman | |
| 4,322,914 A | 4/1982 | McGaughey | |
| 4,392,329 A | 7/1983 | Suzuki | |
| 4,413,446 A | 11/1983 | Dittrich | |
| 4,453,346 A | 6/1984 | Powell et al. | |
| 4,479,330 A * | 10/1984 | Muller | 49/303 |
| 4,496,942 A | 1/1985 | Matsuoka | |
| 4,513,536 A * | 4/1985 | Giguere | 49/470 |
| 4,535,563 A | 8/1985 | Mesnel | |
| 4,614,060 A * | 9/1986 | Dumenil et al. | 49/303 |
| 4,656,779 A * | 4/1987 | Fedeli | 49/318 |
| 4,656,799 A | 4/1987 | Maryon | |
| 4,716,693 A | 1/1988 | Webster | |
| 4,765,105 A | 8/1988 | Tissington et al. | |
| 4,768,316 A | 9/1988 | Haas | |
| 4,831,509 A | 5/1989 | Jones et al. | |
| 4,837,560 A | 6/1989 | Newberry | |
| 4,870,909 A | 10/1989 | Richter | |
| 4,936,049 A | 6/1990 | Hansen | |
| 5,007,202 A | 4/1991 | Guillon | |
| 5,020,292 A | 6/1991 | Strom et al. | |
| 5,029,911 A | 7/1991 | Daniels | |
| 5,030,488 A | 7/1991 | Sobolev | |
| 5,187,867 A | 2/1993 | Rawlings | |
| 5,293,726 A | 3/1994 | Schick | |
| 5,327,684 A | 7/1994 | Herbst | |
| 5,339,881 A | 8/1994 | Owens | |
| 5,349,782 A | 9/1994 | Yulkowski | |
| 5,379,518 A | 1/1995 | Hopper | |
| 5,446,997 A | 9/1995 | Simonton | |
| 5,467,559 A * | 11/1995 | Owens | 49/321 |
| 5,479,151 A | 12/1995 | Lavelle et al. | |
| 5,511,833 A | 4/1996 | Tashman et al. | |
| 5,521,585 A | 5/1996 | Hamilton | |
| 5,522,180 A * | 6/1996 | Adler et al. | 49/309 |
| 5,522,195 A | 6/1996 | Bargen | |
| 5,569,878 A | 10/1996 | Zielinski | |
| 5,584,142 A | 12/1996 | Spiess | |
| 5,605,013 A | 2/1997 | Hogston | |
| 5,638,639 A | 6/1997 | Goodman et al. | |
| 5,784,834 A | 7/1998 | Stutzman | |
| 5,786,547 A | 7/1998 | Zielinski | |
| 5,870,859 A | 2/1999 | Kitada | |
| 5,870,869 A | 2/1999 | Schrader | |
| 5,964,060 A | 10/1999 | Furlong | |
| 6,041,552 A | 3/2000 | Lindahl | |
| 6,057,658 A | 5/2000 | Kovach et al. | |
| 6,082,047 A | 7/2000 | Comaglio et al. | |
| 6,105,313 A * | 8/2000 | Holloway et al. | 49/319 |
| 6,112,466 A * | 9/2000 | Smith et al. | 49/306 |
| 6,112,467 A | 9/2000 | Bark et al. | |
| 6,112,496 A | 9/2000 | Hugus et al. | |
| 6,170,195 B1 | 1/2001 | Lim | |
| 6,173,533 B1 | 1/2001 | Cittadini et al. | |
| 6,181,089 B1 | 1/2001 | Kovach et al. | |
| 6,202,353 B1 | 3/2001 | Giacomelli | |
| 6,218,939 B1 | 4/2001 | Peper | |
| 6,243,999 B1 | 6/2001 | Silverman | |
| 6,289,643 B1 | 9/2001 | Bonar | |
| 6,318,037 B1 | 11/2001 | Hansen | |
| 6,442,899 B1 | 9/2002 | Gledhill | |
| 6,490,832 B1 | 12/2002 | Fischbach et al. | |
| D470,252 S | 2/2003 | Castrey | |
| 6,546,682 B1 | 4/2003 | DeBlock et al. | |
| 6,553,735 B1 | 4/2003 | Wang Chen | |
| 6,568,131 B1 | 5/2003 | Milano, Jr. | |
| 6,619,005 B1 | 9/2003 | Chen | |
| 6,644,884 B2 | 11/2003 | Gledhill | |
| 6,651,389 B2 | 11/2003 | Minter et al. | |
| 6,772,818 B2 | 8/2004 | Whitley et al. | |
| 6,786,005 B1 | 9/2004 | Williams | |
| 6,871,902 B2 | 3/2005 | Carson et al. | |
| 6,973,753 B2 * | 12/2005 | Liebscher | 49/308 |
| 7,010,888 B2 | 3/2006 | Tumlin et al. | |
| 7,124,538 B1 | 10/2006 | Kline | |
| 7,145,436 B2 | 12/2006 | Ichikawa et al. | |
| 7,185,468 B2 | 3/2007 | Clark et al. | |
| 7,487,616 B2 | 2/2009 | Deaver | |
| 7,566,035 B2 | 7/2009 | Bonshor | |
| 7,624,539 B2 * | 12/2009 | Speyer et al. | 49/484.1 |
| 7,627,987 B2 | 12/2009 | Thielmann et al. | |
| 7,665,245 B2 | 2/2010 | Speyer et al. | |
| 7,685,774 B2 | 3/2010 | Thielmann | |
| 7,685,775 B2 | 3/2010 | Speyer et al. | |
| 7,685,776 B2 | 3/2010 | Speyer et al. | |
| 7,707,773 B2 | 5/2010 | Thielmann et al. | |
| 7,719,213 B2 | 5/2010 | Herman et al. | |
| 2003/0033786 A1 | 2/2003 | Yulkowski | |
| 2004/0068935 A1 | 4/2004 | Ichikawa et al. | |

(56) References Cited

U.S. PATENT DOCUMENTS

2005/0097842 A1 5/2005 Arcamonte et al.
2005/0102908 A1 5/2005 Martin
2006/0207199 A1 9/2006 Darnell
2007/0289221 A1 12/2007 Speyer et al.
2009/0151259 A1 6/2009 Speyer et al.
2009/0165415 A1 7/2009 Salerno
2009/0165423 A1 7/2009 Salerno
2010/0077665 A1 4/2010 Speyer et al.

OTHER PUBLICATIONS

Patio Life—Operation, retrieved online at: http://www.rotohardware.com/Products/Patio%20Life/PL-Operation.htm (2006).

International Search Report for Application No. PCT/US2010/029383, dated May 25, 2010.

International Search Report for Application No. PCT/US2010/029206, dated Jun. 2, 2010.

\* cited by examiner

ACTIVE SEALING AND SECURING SYSTEMS FOR DOOR/WINDOW

CROSS-REFERENCE TO RELATED APPLICATIONS

This application is a Continuation-In-Part of U.S. application Ser. No. 11/425,377, filed on Jun. 20, 2006, incorporated herein by reference in its entirety.

BACKGROUND OF THE INVENTION

1. Field of the Invention

The disclosure relates generally to sealing systems for use with panels, such as a door or a window, within a frame and, more specifically, to an active sealing system for providing an improved seal between a panel and frame.

2. Description of the Related Art

Certain types of panels, such as doors and windows, are positioned within openings of a wall and/or other structures using a frame. These panels may also open and close by pivoting relative to the frame. Alternatively, the one or more panel may slide relative to the frame. An issue associated with these types of panels is the integrity of the seals between the panels and the frame. In many instances, these seals are an insufficient barrier in preventing the transfer of such environmental elements as noise, weather, water, and insects from one side of the panel to the other side of the panel.

Attempts have been made to address these issues by using various types of weather stripping between the panels and frame. For example, the weather stripping may be strip of felt, foam, or a pile of flexible synthetic material. In many instances, however, this weather stripping fails to act as a sufficient seal between the panels and frame. Another issue prevalent associated with the seals between a frame and panel or between adjacent panels is that these seals can become disjoined. Either intentionally or unintentionally, the alignment between the frame and panel or between adjacent panels may be disturbed which can degrade the quality of the seal, since, in many instances, the integrity of the seal relies upon these members having certain positional relationships relative to one another.

Another issue associated with the movement of one or more panels relative to the frame is structural integrity and/or security of the panels relative to the frame. While in certain circumstances, allowing the panel to move relative to the frame is desirable, in other circumstances, not allowing the panel to move relative to the frame is desirable for the purpose of preventing undesired access through the panel. Means for providing these separate functionalities, however, can be incompatible with one another, and the means employed to provide both functions often involve tradeoffs that reduce the effectiveness of both functions.

There is, therefore, also a need for a sealing system that effectively allows both a panel to move relative to the frame and also to selectively prevent movement of the panel relative to the frame. There is also a need for a sealing system that can be employed between a frame and panel that prevents the transfer from one side of the panel to the other side of the panel such environmental effects as noise, weather, water, heat/cold, and insects.

BRIEF SUMMARY OF THE INVENTION

Embodiments of the invention address deficiencies of the art with respect to effectively creating a seal between a panel and a frame. In this regard, a combined sealing system for connecting a panel to a frame includes a first active sealing system and a first passive seal. The first active sealing system engages a first surface of the panel or a first surface of the frame. The first passive seal engages a second surface of the panel and a second surface of the frame. Upon the panel being in a single closed position relative to the frame, the active sealing system has a locked configuration and an unlocked configuration, and the active sealing system in the locked configuration causes the first passive seal to be further engaged. The panel may pivot relative to the frame. The first active sealing system may be positioned within one or both of the panel and the frame.

In certain aspects of the combined sealing system, multiple active sealing systems are provided to respectively connect all pairs of adjacent surfaces of the panel and the frame. Also, engagement of the first active sealing system causes engagement of all the active sealing systems.

In other aspects of the combined sealing system, a second passive seal is included. Along a plane perpendicular to and intersecting the panel and frame and perpendicular to adjoining sides of the panel and frame, the first active sealing system creates an active seal positioned between the first passive seal and the second passive seal. Also along the plane perpendicular to and intersecting the panel and frame and perpendicular to adjoining sides of the panel and frame, the first passive seal is positioned closer to outer portions of the panel and frame than the active seal created by the first active sealing system. The active seal is created between the first surface of the panel and the first surface of the frame only in the locked configuration of the first active sealing system. Additionally, the active seal is created along substantially an entire side of the panel and the frame In another embodiment, a sealing system is provided for connecting a panel to a frame, and the panel is movable relative to a frame in a first direction towards a single closed position. The sealing system includes a first active sealing system for creating an active seal between a first surface of the panel or a first surface of the frame. Upon the panel being in a single closed position relative to the frame, the active sealing system has a locked configuration and an unlocked configuration. The active seal is created between the first surface of the panel and the first surface of the frame only in the locked configuration of the first active sealing system, and in the locked configuration and while the panel is stationary relative to the frame, the first active sealing system generates a force component in a direction parallel to the first direction to prevent movement of the panel from the single closed position.

In yet another embodiment, a sealing system is provided for connecting a panel to a frame. The sealing system includes a movable member pivotably connected to one of the panel and the frame for forming an active seal between the panel and the frame. Upon the panel being in a single closed position relative to the frame, the active sealing system has a locked configuration and an unlocked configuration. The active seal is created between the first surface of the panel and the first surface of the frame only in the locked configuration of the first active sealing system, and the movable member pivots from a first position in the locked configuration to a second position in the unlocked position. A rotatable drive gate engages the movable member to drive movement of the movable member.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1A:
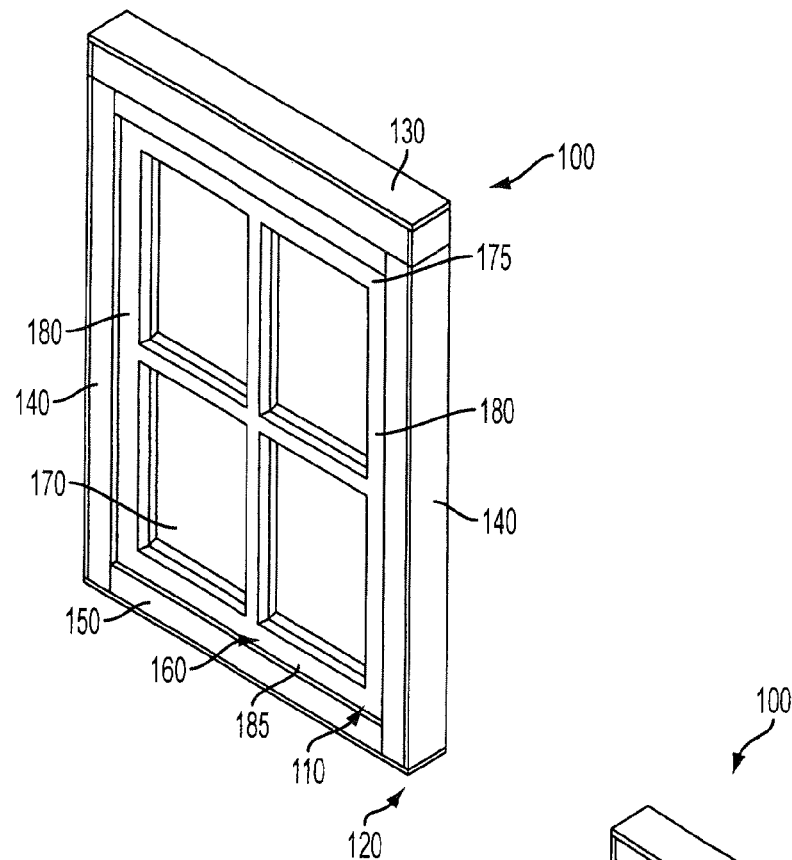
FIGS. 1A and 1B are perspective views, respectively, of a door/window system in a closed and open position in accordance with the inventive arrangements.
Figure 1B:
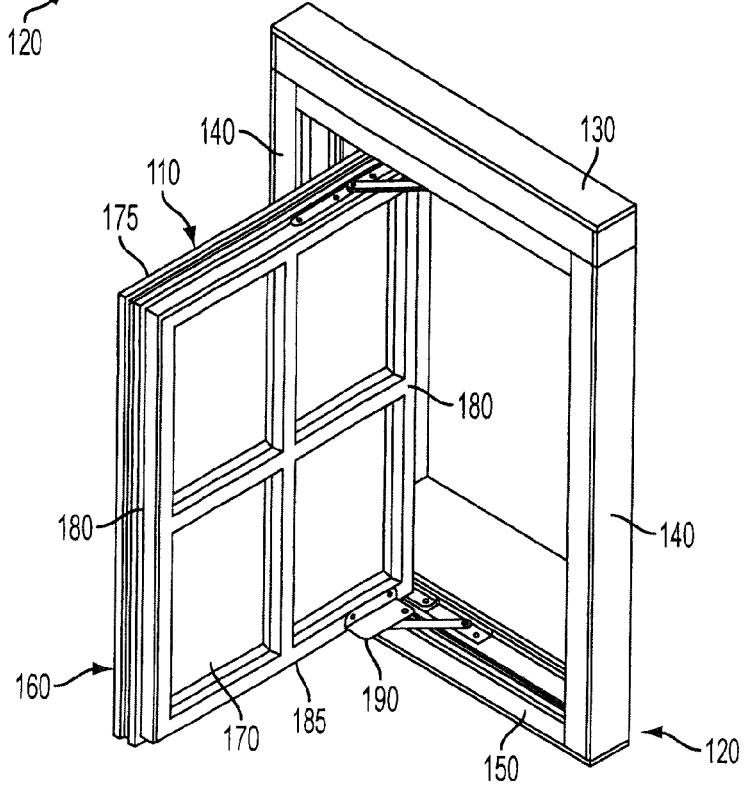
Figure 2:
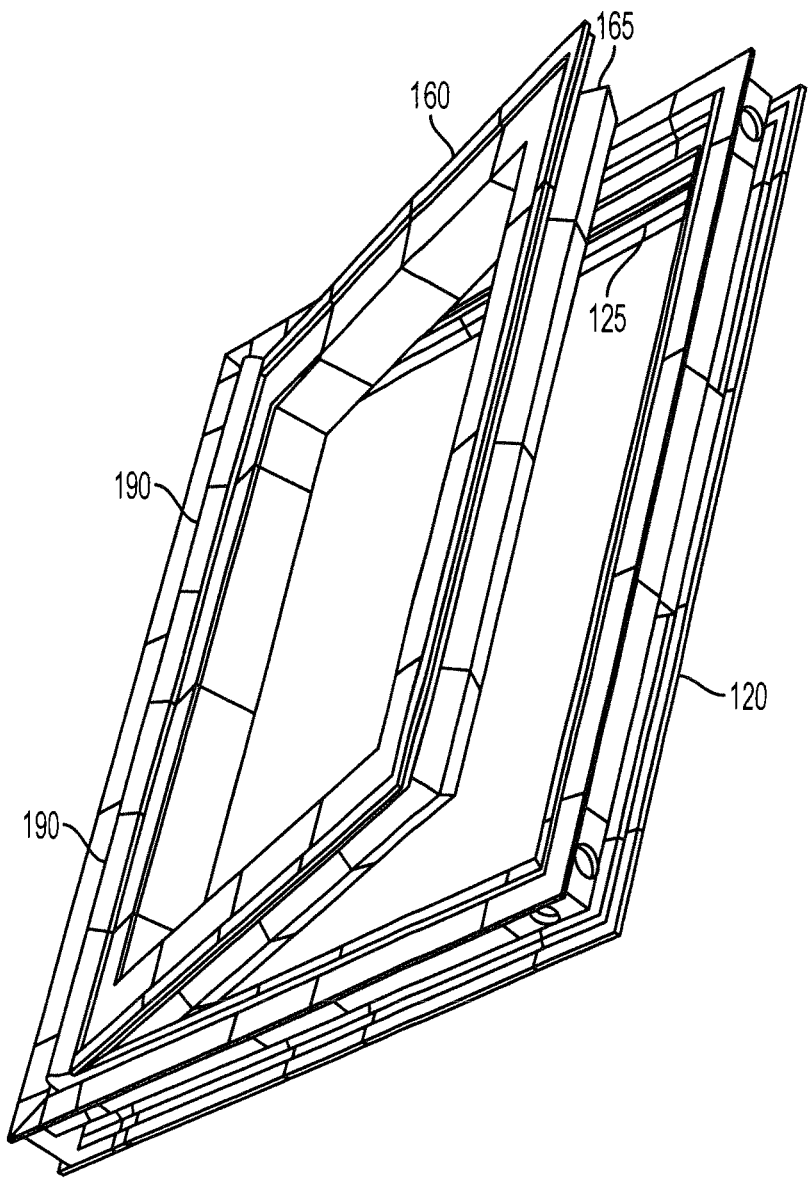
FIG. 2 is a perspective view of the frame and sash of the door/window system.

FIGS. 1A, 1B and 2 illustrate an exemplar door/window system 100 for use with the improved sealing system 200. The sealing system 200 can be used with many types of doors and/or windows, and the sealing system 200 is not limited to the particular door/window system 100 illustrated. For example, the sealing system 200 may be used with pocket doors, sliding doors, French doors, entry doors, garage doors, sliding windows, single-hung windows, double-hung windows, casement windows, and awning windows. The door/window system 100 includes at least one panel 110 connected to and movable relative to a stationary frame 120.

The door/window system 100 is not limited in the manner in which the panel 110 moves relative to the frame 120. For example, the panel 110 may linearly slide relative to the frame 120. In certain aspects of the door/window system 100, however, the panel 110 pivots relative to the frame 120 about a hinge 190. Many types of hinges 190 are capable of allowing the panel 110 to pivot relative to the frame 120, and any hinge 190 so capable is acceptable for use with the present door/window system 100.

The frame 120 may include a header 130, jambs 140, and a sill 150. A header 130 is a structural member that spans an upper portion of the window/door opening. Jambs 140 are the outermost vertical side members of the frame 120. A sill 150 is a threshold or structural member that spans a lower-most portion of the window/door opening. As recognized by those skilled in the art, different terms may also be associated with the above-structure identified as the header 130, jambs 140, and sill 150.

Each panel 110 may include a sash 160 that surrounds a pane 170. The pane 170 is not limited as to a particular material. For example, the pane 170 may be translucent, such as glass or plastic, opaque, such as with wood or metal, or any combination thereof. The sash may include a header rail 175, jamb or stile rails 180, and a sill rail 185. As recognized by those skilled in the art, different terms may also be associated with the structure identified as the header rail 175, the jamb or stile rail 180, and sill rail 185.

The sealing system 200 (see FIGS. 3A-3C, 4A-4D, 5A-5C) may be used with each of the members 175, 180, 185 of the sash 160 to form a seal between each pair of adjacent surfaces of the sash 160 of the panel 110 and the frame 120. In this manner, each of the separate sides of the panel 110 may employ the sealing system 200. As will be described in more detail below, not only does the sealing system 200 provide at least one seal between adjacent members of sash 160 and frame 120, each of the sealing systems 200 may be configured to prevent the movement of the panel 110 relative to the frame 120. In so doing, the sealing systems 200 can act as a lock and/or security device that prevents the forced opening of the panel 110 relative to the frame 120. Many types of sealing systems 200 so capable are known in the art, and the present door/window system 100 is not limited as to a particular type of sealing system 200.

Additionally, although the present door/window system 100 is described herein with particular types of sealing systems 200 being positioned in particular locations, the door/window system 100 is not limited as to a particular type of sealing system 200 or a particular location of the sealing system 200. For example, a sealing system 200 may be positioned within the frame 120 and/or the sash 160.

To prevent the forced opening of the panel 110, the sealing systems 200 are not limited as to a percentage of coverage between particular members of the frame 120 and/or panel 110. For example, the sealing systems 200 may only cover a fractional number (e.g., 10%, 50%, 85%) of the length between particular members of the frame 120 and/or panel 110. However, in certain aspects, the sealing systems 200 provide substantially complete coverage between the sash 160 of a panel 110 and the frame 120. In so doing, the combined sealing systems 200 can provide a seal substantially, completely around the panel 110.

Referring to FIGS. 3A-3C and 4A-4D, a sealing system 200 for use in the door/window system 100 is illustrated. As the panel 110 moves from an open position (e.g., FIGS. 3A, 4A) to a closed position (e.g., Figs, 3B-3C and 4B-4D), a frame mating profile 125 of the frame 120 engages a sash mating profile 165 of the sash 160. Although not limited in this manner, in certain aspects of the sealing system 200, the mating profiles 125, 165 are selected to prevent movement (shown by arrows in FIGS. 3A, 4A) of the panel 110 past a particular position.

Figure 3A:
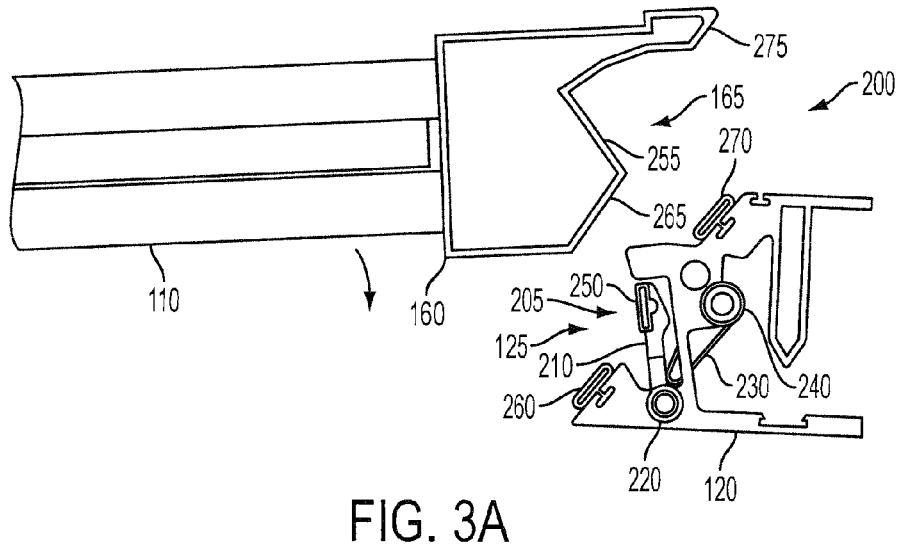
FIGS. 3A-3C are cross-sectional views of the sealing system positioned in the frame and sash of the door/window system, respectively, in the open, partially engaged, and locked configurations.
Figure 3B:
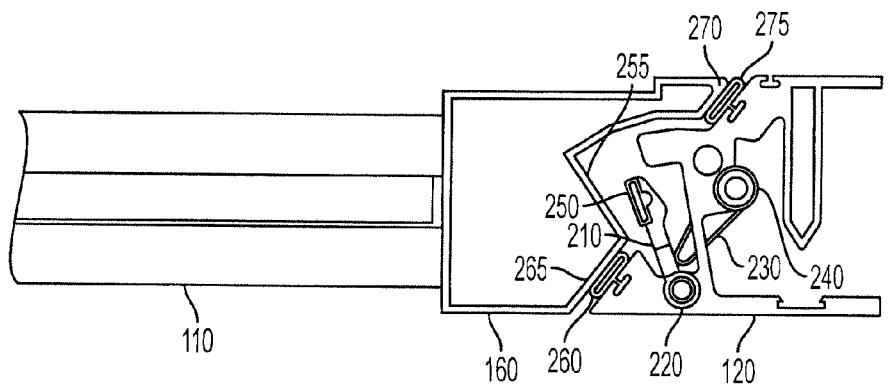
Figure 3C:
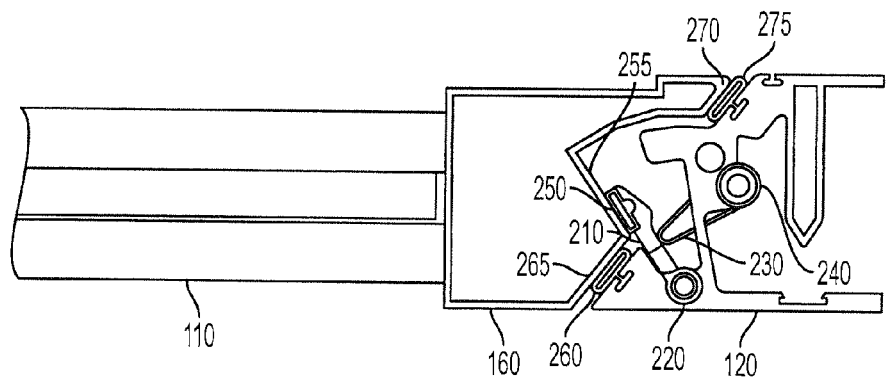
Figure 4A:
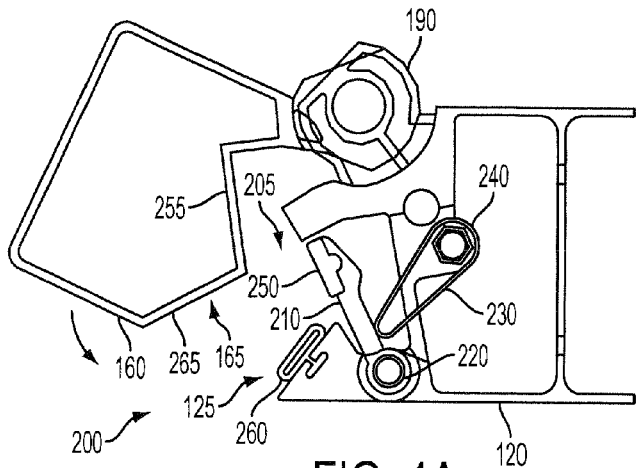
FIGS. 4A-4D are cross-sectional views of the sealing system positioned in the frame and sash of the door/window system at the hinges, respectively, in the open, closed but unlocked, partially engaged, and locked configurations.
Figure 4B:
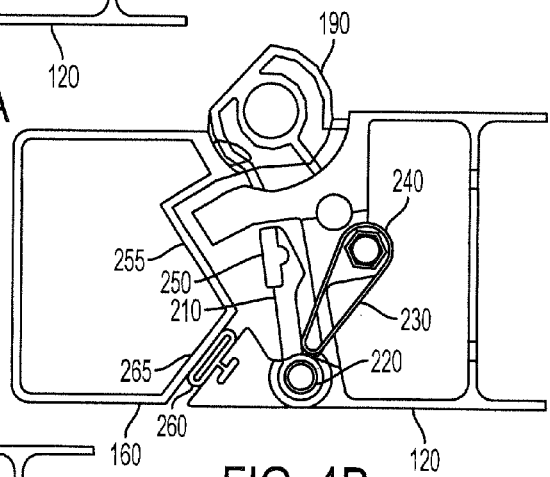
Figure 4C:
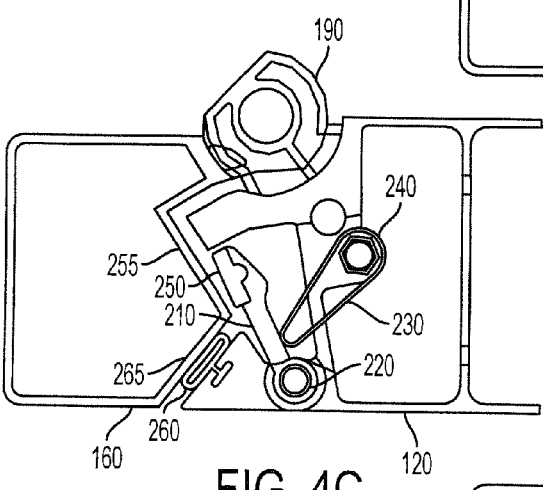
Figure 4D:
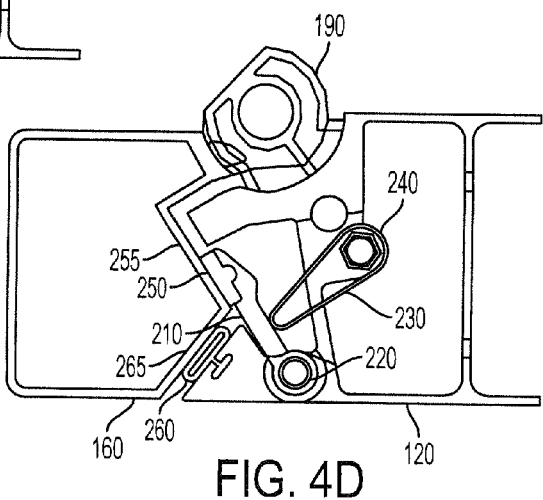

Although many different profiles are capable of preventing movement of the panel 110 past a particular position, in certain aspects of the sealing system 200, the mating profiles 125, 165 respectively include surfaces 260, 270 and 265, 275 that are at an angle that is not tangent to an arc created by the rotation of the panel 110. As illustrated in FIG. 4B, only a single matched pair of angled surfaces 260, 265 may be employed. Alternatively, as illustrated in FIG. 3B, two or more matched pairs of angled surfaces 260/265, 270/275 may be employed.

Although the sealing system 200 is not limited in this manner, the one or more matched pairs of angled surfaces 260/265, 270/275 may include seals on one or both surfaces. However, in certain aspects of the sealing system 200, the seals (hereinafter referred to as 260, 270) are located on the frame mating profile 125 of the frame 120.

The seals 260, 270 act to retard the movement of air, water, etc. and/or noise across the seals 260, 270 and any seal so capable is acceptable for use in the sealing system 200. However, in certain aspects of the sealing system 200, the seals 260, 270 are formed from a compressible material, such as foam and include T-shaped bases, which fit into T-shaped channels in the frame mating profile 125. As the panel 110 moves from the open position to the closed position, the angled surfaces 265, 275 of the sash 160 engage and compress the seals 260, 270.

Upon the panel 110 being disposed in the closed position (e.g., FIGS. 3B-3B, 4B-4D), the sealing system 200 also includes an active seal 205 having a locked configuration and an unlocked configuration while the panel 110 is disposed in the closed position. The active seal 205 operates by having a movable member disposed in one of the frame 120 and sash 160 engage a stationary or movable portion of the other of the sash 160 and frame 120. Thus, a movable member may be positioned on the frame 120 and/or the sash 160. However, in certain aspects of the sealing system 200, as illustrated, the movable member 210 is positioned in the frame 120 and engages a stationary face 255 on the sash 160.

The active seal 205 can perform one or more of at least two functions, which may be performed separately or together. One of these functions is to create a seal between the movable member 210 and the opposing face 255. The other of the two functions is enhance and/or engage passive seals located between other portions of the frame 120 and sash 160. Unlike the active seal 205, which has both a completely unlocked/disengaged configuration and a locked/engaged configuration while the panel 110 is in a single position relative to the frame 120 (e.g., FIG. 3B versus FIG. 3C, FIG. 4B versus FIG. 4D), the passive seals (e.g., seals 260, 270) may engaged, or at least partially engaged, upon the panel 110 being positioned in the frame 120. For example, in FIGS. 3B-3C and 4B-4D, seals 260, 270 are at least partially engaged upon the panel 110 being positioned within the frame 120.

Referring to the first function, the movable member and/or opposing face 255 may include seals on one or both surfaces. However, in certain aspects of the active seal 205, the seal (hereinafter referred to as gate seal 250) is located on the movable member (hereinafter referred to as seal gate 210). Similar to the previously described seals 260, 270, the gate seal 250 can be any type of seal capable of acting to retard the movement of air, water, etc. and/or noise across the gate seal 250.

Referring to the second function, the gate seal 250 presses against the opposing face 255, and in so doing, causes one or more other seals (for example, seals 260, 270) to engage or further engage. For example, as the gate seal 250 presses against the opposing face 255, the generated force includes a component in a direction parallel that causes the sash 160 and panel 110 to moved into the closed position relative to the frame 120, thereby compressing the seals 260, 270. Alternatively, this generated force may drive a portion of either the sash 160 or frame 120 into the seals 260, 270, thereby engaging or further engaging the seals 260, 270.

The active seal 205 is not limited in the manner by which the gate seal 250 engages the opposing face 255. For example, the seal gate 210 may operate as a linearly-traveling piston. However, in certain aspects of the active seal 205, the seal gate 210 pivots about a seal pivot 220. The manner in which the seal gate 210 itself is driven in not limited. For example, the seal gate 210 may be directly driven, for example, at the seal pivot 220. Alternatively, in certain aspects of the active seal, the seal gate 210 is driven using a drive gate 230 that causes the seal gate 210 to rotate about the seal pivot 220.

Figure 5A:
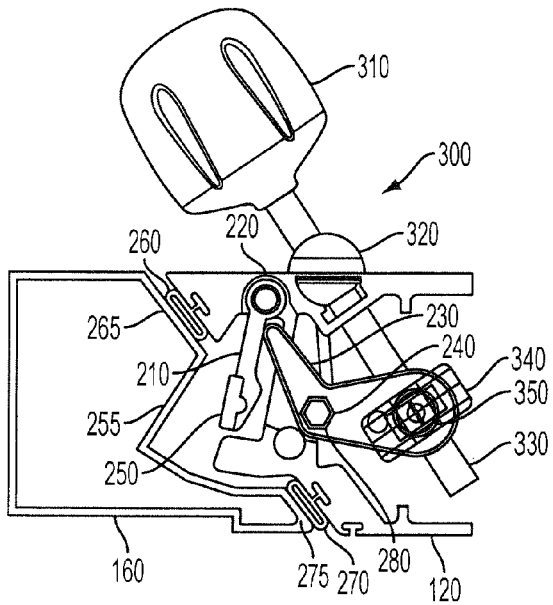
FIGS. 5A-5C are cross-sectional views of a drive system and the sealing system positioned in the frame and sash of the door/window system, respectively, in the closed but unlocked, partially engaged, and locked configurations.
Figure 5B:
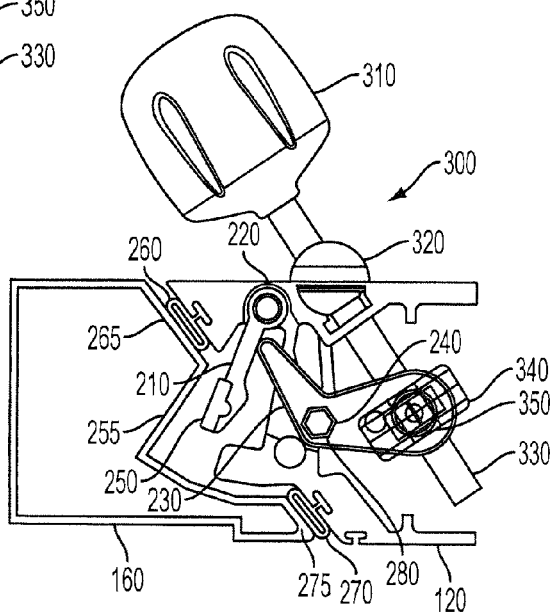
Figure 5C:
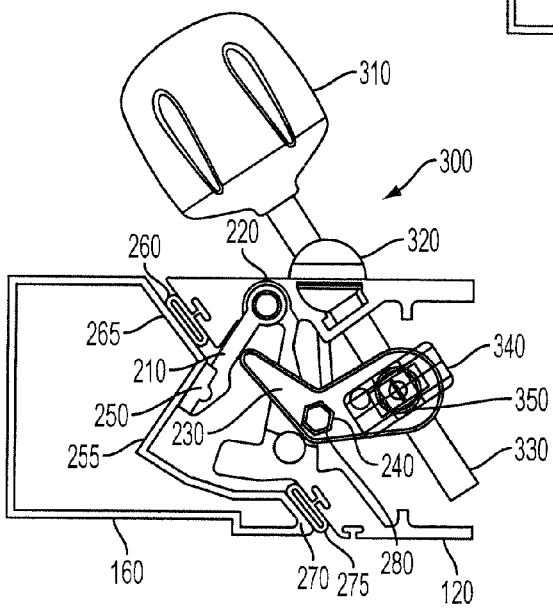

Although not limited in this manner, the drive gate 230 pivots about a drive pivot 240 and is itself driven by a drive system 300 (see discussion with regard to FIGS. 5A-5C). By using leverage generated by these inter-engaging levers 210, 230, the active seal 205 is capable of exerting significant force against the frame 120 or sash 160. In so doing, both of the aforementioned functions of creating a seal between the movable member 210 and the opposing face 255 and enhancing and/or engaging seals 260, 270 located between other portions of the frame 120 and sash 160 may be improved.

In certain aspects of the sealing system 200, the active seal 205 is positioned either between two other seals 260, 270 and/or positioned behind one seal 270 relative to an outside portion of the door/window system 100. Since the active seal 205 includes at least one movable member 250, the active seal 205 may be more susceptible to environmental effects, such as water and/or excessive heat/cold. By positioning the active seal 205 between two other seals 260, 270 and/or positioning the active seal 205 behind one seal 270 relative to an outside portion of the door/window system 100, the one or more seals 260, 270 can reduce the impact of these adverse environmental effects on the active seal 205.

Referring to FIGS. 5A-5C, a drive system 300 for use in the door/window system 100 is illustrated. The drive system 300 moves the sealing system 200 from the unlocked configuration (e.g., FIGS. 3A-3B, 4A-4C, 5A-5B) to a locked configuration (e.g., FIGS. 3C, 4D, 5C). The drive system 300 may also move the sealing system 200 from the locked configuration to the unlocked configuration. In certain aspects, the drive system 300 is configured to simultaneously move each of the separate sealing systems 200 (see the discussion with regard to FIG. 6). In other aspects of the door/window system 100, however, multiple drive systems 300 may be provided to separately close one or multiple sealing systems 200.

How the drive system 300 moves the sealing system 200 from the unlocked configuration to the locked configuration (and back again) is not limited as to a particular manner and/or device. As can be readily envisioned, the configuration and operation of the drive system 300 may be determined by the configuration and operation of the sealing systems 200. Although the illustrated drive system 300 is shown as being driven with a manual device, other devices capable of driving a sealing system 200 are commonly known, such as a magnetic, mechanical, and electromechanical devices.

As previously described, the present sealing system 200 operates using a drive gate 230, which urges a seal gate 210 against an opposing face 255 to form a seal between the frame 120 and sash 160. Any drive system 300 capable of driving the drive gate 230 in this manner is acceptable for use with the present door/window system 100. In a present aspect of the door/window system 100, the drive system 300 employs a knob 310, which rotates a threaded shaft 330 about a bearing 320. A thread gear 340 is positioned about the threaded shaft 330, and rotation of the threaded shaft 330 moves the thread gear 340 up or down relative to the threaded shaft 330. The thread gear 340 is attached to the drive gate 230 about a gear pivot 350.

Referring to FIGS. 5A, 5B, and 5C in sequence, as the thread gear 340 moves up the threaded shaft 330, a portion of the drive gate 230 is also drawn upward. This motion rotates the drive gate 230 counter-clockwise (as viewed in the illustrations) about the drive pivot 240, which causes the drive gate 230 to drive the seal gate 210 against the gate seal mating face 255. The drive gate 230 may also be connected to a drive shaft 280, which is connected, either directly or indirectly, to other drive gates (not shown) so as to also drive the movement of these drive gates.

The opposite movement of the thread gear 340 from a higher position to a lower position on the threaded shaft 340 rotates the drive gate 230 in an opposite direction about the drive pivot 240. Many techniques or devices can be used to return the seal gate 210 to its fully unlocked position (i.e., FIG. 5A), and the present door/window system 100 is not limited as to a particular technique or device so capable. However, in a current aspect, one or more resilient members (not shown) return the seal gate 210 to an unengaged position.

Figure 6:
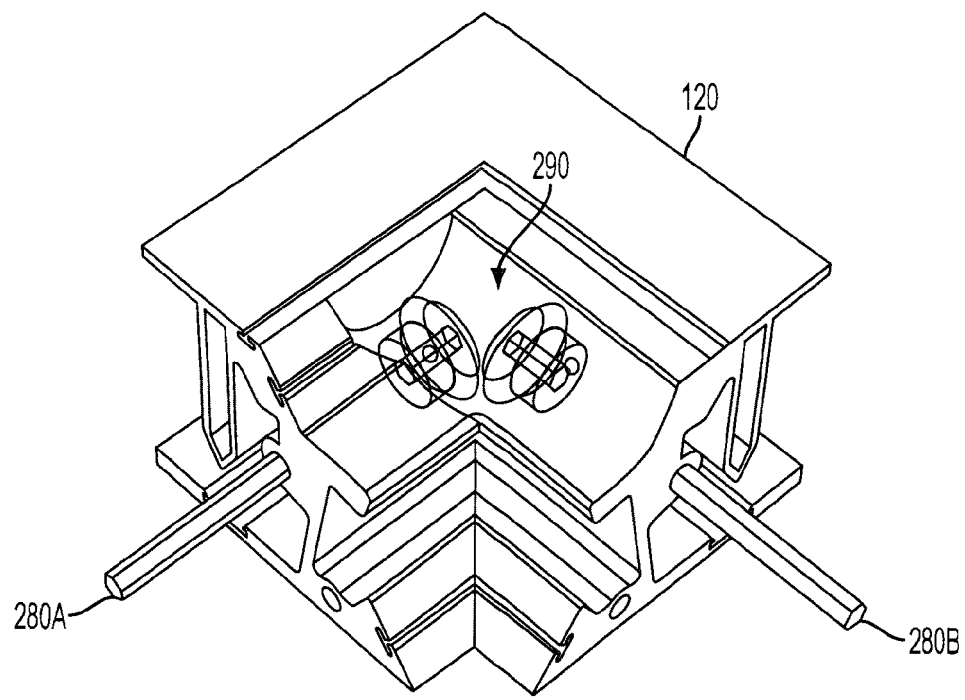
FIG. 6 is a perspective view of a corner of the frame of the sealing system.
Figure 7:
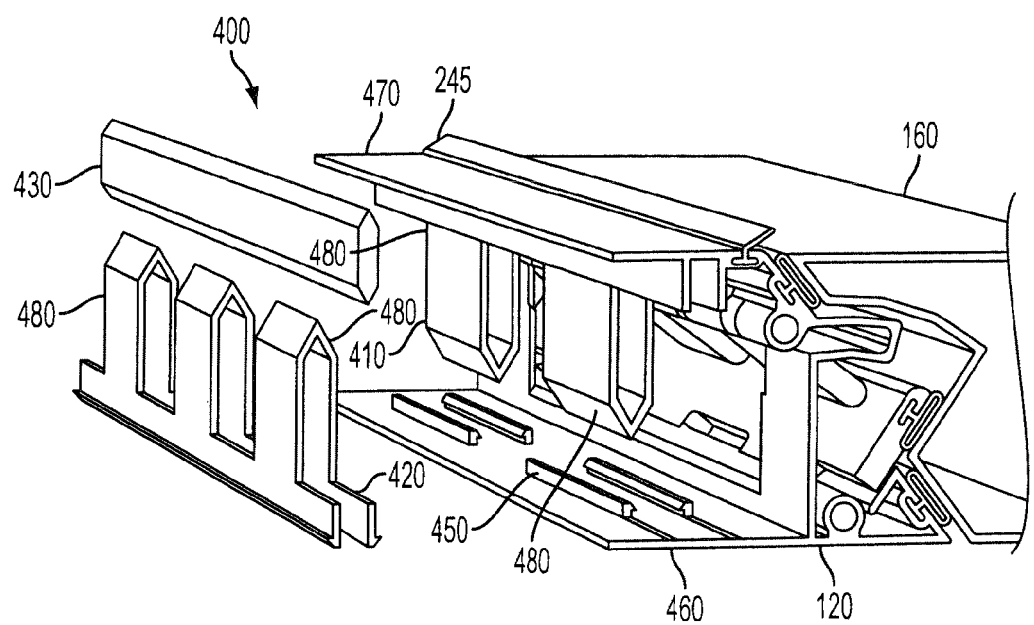
FIG. 7 is an exploded perspective view of a framing system in accordance with the inventive arrangements.

Referring to FIG. 6, a transfer system 290 for use in the door/window system 100 is illustrated. The transfer system 290 transfers motion, such as rotation, from one drive element $280_A$ to another drive element $280_B$. In so doing, the motion generated by a single drive system 300 is capable of driving two or more sealing systems 200 located on different edges of the frame 120 and sash 160 through the use of one or more transfer systems 290. Alternatively or, in addition to a single drive system 300 driving two or more sealing systems 200, as previously discussed, multiple drive systems 300 can each separately drive one or more sealing systems 200.

Many types of transfer systems are capable of transferring motion from one drive element $280_A$ to another drive element $280_B$, and the door/window system 100 is not limited as to transfer system 290 so capable. For example, as illustrated, the transfer system 290 may include a set of inter-engaging gears respectively attached to the drive elements $280_A$, $280_B$ to transfer rotation from one drive element $280_A$ to the other drive element $280_B$.

Referring to FIG. 7 and FIGS. 8A-8C, a framing system 400 for use in the door/window system 100 is illustrated. The framing system 400 may be positioned about the frame 120 and/or the sash 160. As illustrated, the framing system 400 according to certain aspects of the door/window system 100 is positioned within the frame 120. The frame system 400 may serve several functions. In certain aspects, one function is to provide a structural support for a portion of the sealing system 200 against one or both of the frame 120 and sash 160.

In additional aspects, the framing system 400 also functions to provide a thermal and/or acoustical break between an outer portion 470 of the framing system 400 and an inner portion 460 of the framing system 400. Although not limited in this manner, the framing system 400 and certain portions of the sealing system 200 may be formed from a metal, such as aluminum. These types of materials readily conduct heat and/or transmit sound. Therefore, it is advantageous to "break" the thermal and/or acoustical connection from an outer portion 470 to an inner portion 460 to respectively reduce the transmission of heat/cold and noise across the framing system 400.

Many types of framing systems 400 are capable of reducing the transmission of heat/cold and noise across the framing system 400, and the door/window system 100 is not limited as to a particular framing system 400 so capable. However, in certain aspects of the framing system 400, the framing system 400 includes a pair of combs 410, 420, which are respectively attached to the outer and inner portions 470, 460 of the framing system 400.

Each of the combs 410, 420 includes multiple teeth 480 having a first side 485, a second side 490, and a gap 495 between the first side 485 and the second side 490. The teeth 480 of the combs 410, 420 loosely inter-engage with one another to form a channel 440, which is comprised of portions of the gaps 495 of the teeth 480 of both the first comb 410 and the second comb 410. The tightness or looseness of the fit between the inter-engaged combs 410, 420 is not limited as to a particular clearance. However, preventing any contact between the combs 410, 420 increases the effectiveness of the thermal and/or acoustical break. Conversely, close contact between the combs 410, 420 may increase the structural integrity of the framing system 400.

An insert 430 is position within the channel 440 formed by the inter-engaging of the combs 410, 420. The insert 430 acts as the thermal and/or acoustical break between the combs 410, 420 and, thus, the outer and inner portions 470, 460 of the framing system 400. The insert 430 may also provide structural support to prevent the combs 410, 420 from being pushed together and/or pulled apart. Thus, the material from which the insert 430 is formed may vary depending upon the desired combination of functionality of the framing system 400. For example, if minimal structural support is required, then a material, such as large-celled solid foam having low thermal and/or acoustical transmissive properties may be selected for the insert 430. Alternatively, if greater structural support is required, a more solid material, such a high-density plastic, may be selected for the insert 430. Many materials have these combinations of desired characteristics, and the present framing system 400 is not limited to a material of the insert 430 so capable.

One or both of the combs 410, 420 may be attachable to or integral with the outer and inner portions 470, 460 of the framing system 400. In certain aspects of the framing system 400, however, one of the combs 410 is integrally formed with one portion 470 of the framing system 400, and the other of the combs 420 is attachable to the other portion 460 of the framing system 400 to aid in the assembly of the framing system 400. Although not limited in this manner, the comb 420 is attachable to the framing system 400 using barbed hooks 450.

Figure 8A:
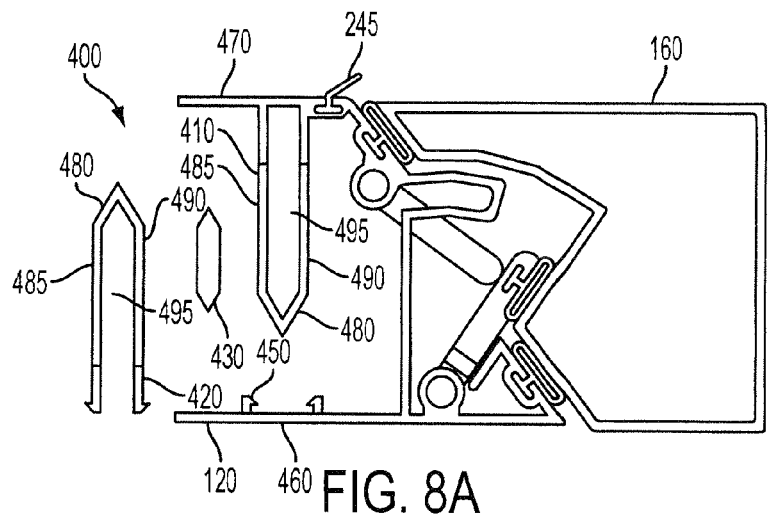
FIGS. 8A-8C are cross-sectional views of the framing system, respectively, disassembled, partially assembled, and completely assembled.
Figure 8B:
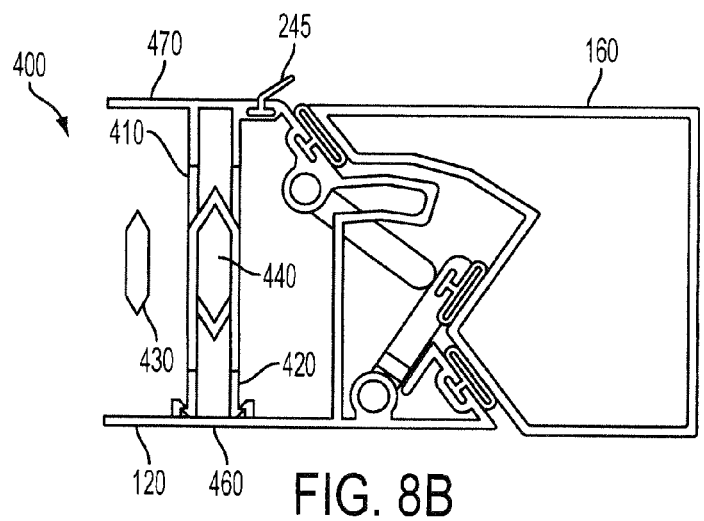
Figure 8C:
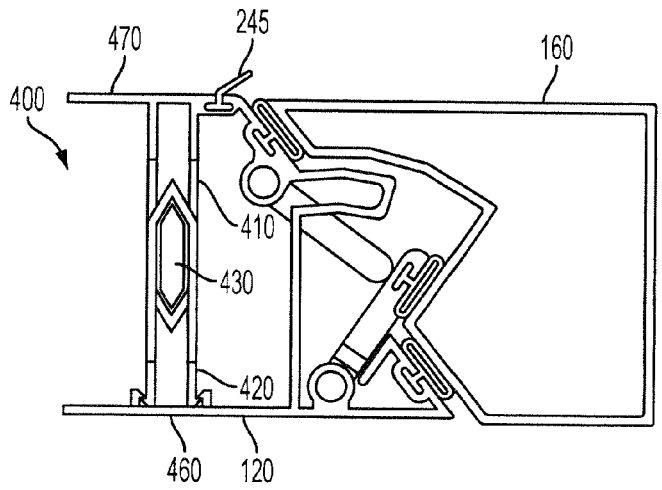

Referring to FIGS. 8A-8C, the sealing system 200, may include a drip guard 245 that is attached to an exterior portion of the frame 120 and/or sash 160 to prevent material, such as water, from entering the interface between the frame 120 and sash 160. Many types of drip guards 245 capable of preventing material from entering an interface between two adjoining objects are known, and the sealing system 200 is not limited as to a particular drip guard 245 so capable.

What is claimed is:

1. A combined sealing system for connecting a panel to a stationary frame, comprising:
an active sealing system provided within the stationary frame for engaging a first surface of the panel;
a first passive seal provided within the stationary frame for engaging a second surface of the panel;
a second passive seal,
wherein along a plane perpendicular to and intersecting the panel and frame and perpendicular to adjoining sides of the panel and frame, the first active sealing system creating an active seal positioned between the first passive seal and the second passive seal, and
wherein the panel pivots relative to the stationary frame, and
wherein when the panel is in a closed position relative to the frame, the active sealing system has a locked configuration and an unlocked configuration, and
wherein only when the panel is both in the closed position relative to the frame and the active sealing system is in the locked configuration, the first passive seal is further engaged.

2. The combined sealing system of claim 1, wherein multiple active sealing systems are provided to respectively engage all pairs of adjacent surfaces of the panel and the frame.

3. The combined sealing system of claim 2, wherein engagement of the first active sealing system causes engagement of all the active sealing systems.

4. The combined sealing system of claim 1, wherein along a plane perpendicular to and intersecting the panel and frame and perpendicular to adjoining sides of the panel and frame, the first passive seal is positioned closer to outer portions of the panel and frame than an active seal created by the first active sealing system.

5. The combined sealing system of claim 1, wherein an active seal is created between the first surface of the panel and the first surface of the frame only in the locked configuration of the first active sealing system.

6. The combined sealing system of claim 5, wherein the active seal is created along substantially an entire side of the panel and the frame.

7. A sealing system for providing one or more seals between a panel and a stationary frame, comprising:
- an active sealing system provided within the stationary frame for engaging a first surface of the panel;
- a first passive seal provided within the stationary frame for engaging a second surface of the panel,
- a second passive seal,
- wherein along a plane perpendicular to and intersecting the panel and frame and perpendicular to adjoining sides of the panel and frame, the first active sealing system creating an active seal positioned between the first passive seal and the second passive seal, and
- wherein, the active sealing system has a locked configuration and an unlocked configuration when the panel is in a closed position relative to the frame, and
- wherein only when the panel is both in the closed position relative to the frame and the active sealing system in the locked configuration, the passive seal is further engaged.

\* \* \* \* \*